(12) United States Patent
Seifert

(10) Patent No.: US 6,793,411 B2
(45) Date of Patent: Sep. 21, 2004

(54) METHOD AND APPARATUS FOR COMMUNICATING SIGNALS WITH AN OPTICAL FIBER

(75) Inventor: Martin Seifert, West Simsbury, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/465,459

(22) Filed: Jun. 19, 2003

(65) Prior Publication Data

US 2003/0223704 A1 Dec. 4, 2003

Related U.S. Application Data

(63) Continuation of application No. PCT/US01/49853, filed on Dec. 21, 2001.
(60) Provisional application No. 60/257,966, filed on Dec. 22, 2000.

(51) Int. Cl.[7] ................................................. G02B 6/36
(52) U.S. Cl. .............................. 385/92; 385/53; 385/88; 361/600
(58) Field of Search .............................. 385/31, 49, 83, 385/88, 89, 90–92

(56) References Cited

U.S. PATENT DOCUMENTS

| | | |
|---|---|---|
| 4,065,203 A | 12/1977 | Goell et al. |
| 4,090,777 A | 5/1978 | Wittke |
| 4,708,429 A | 11/1987 | Clark et al. |
| 4,767,174 A | 8/1988 | Carenco et al. |
| 4,784,452 A | 11/1988 | Hodge et al. |
| 4,803,361 A | 2/1989 | Aiki et al. |
| 5,517,590 A | 5/1996 | Auborn et al. |
| 5,677,973 A | 10/1997 | Yuhara et al. |
| 5,684,902 A * | 11/1997 | Tada ........................... 385/88 |
| 5,729,641 A | 3/1998 | Chandonnet et al. |
| 5,985,086 A | 11/1999 | Peall |
| 6,517,259 B1 * | 2/2003 | Murata ........................ 385/92 |

FOREIGN PATENT DOCUMENTS

| | | |
|---|---|---|
| CA | 1108900 | 9/1981 |
| EP | 0445947 A3 | 2/1991 |
| EP | 0445947 A2 | 2/1991 |
| EP | 0750204 A1 | 6/1996 |
| JP | 55059415 | 5/1980 |
| JP | 59029482 | 2/1984 |
| JP | 60107859 | 6/1985 |
| JP | 63015478 | 1/1988 |
| JP | 03012345 | 1/1991 |
| JP | 03185408 | 8/1991 |

OTHER PUBLICATIONS

Lemaire et al.; "Hydrogen Permeation in Optical Fibres with Hermetic Carbon Coatings"; Electronics Letters, vol. 24, No. 21, 1988, pp 1323–1324.

PCT International Search Report for International application No. PCT/US01/49853.

(List continued on next page.)

*Primary Examiner*—Phan T. H. Palmer
*Assistant Examiner*—Jennifer Doan
(74) *Attorney, Agent, or Firm*—Peter J. Rainville

(57) ABSTRACT

An optical assembly for communication of an optical signal between fiber and a receiver or transmitter, including a body including a guideway, a first semiconductor optical element for conversion between electrical and optical signals and for one of receiving or transmitting light, and an optical fiber. The semiconductor optical element is mounted in register with the body. The optical fiber includes a core, a cladding surrounding the core, and a protective coating surrounding the cladding. The guideway receives a selected length of the optical fiber, and the protective coating is present along a majority of the selected length.

26 Claims, 4 Drawing Sheets

OTHER PUBLICATIONS

International Preliminary Examination Report for International application No. PCT/US01/49853.

Microe Systems; Application Note: "How Miniature Encoders Enable Higher Performance . . . "; (no date).

Newport (Mobarhan et al.); Application Note: "Fiber To Waveguide Alignment Algorithm"; (no date).

Hodge, M.H. & Moras, J.A.; "A Hard Clad Silica Fiber Multi-Tap Bus System"; FOCLAN '86, Orlando, FL.

Beck, W.B.; "Tapping Optical Fiber"; Laser Focus Magazine, Nov. 1987.

Ohlmann, E.; "New Method Improves Optical Fiber Attachment to Substrates"; PhotonicsFiber.com; Feb. 2001.

Savage, N.; "Linking With Light"; IEEE Spectrum Online Feature Article, Aug. 2002.

* cited by examiner

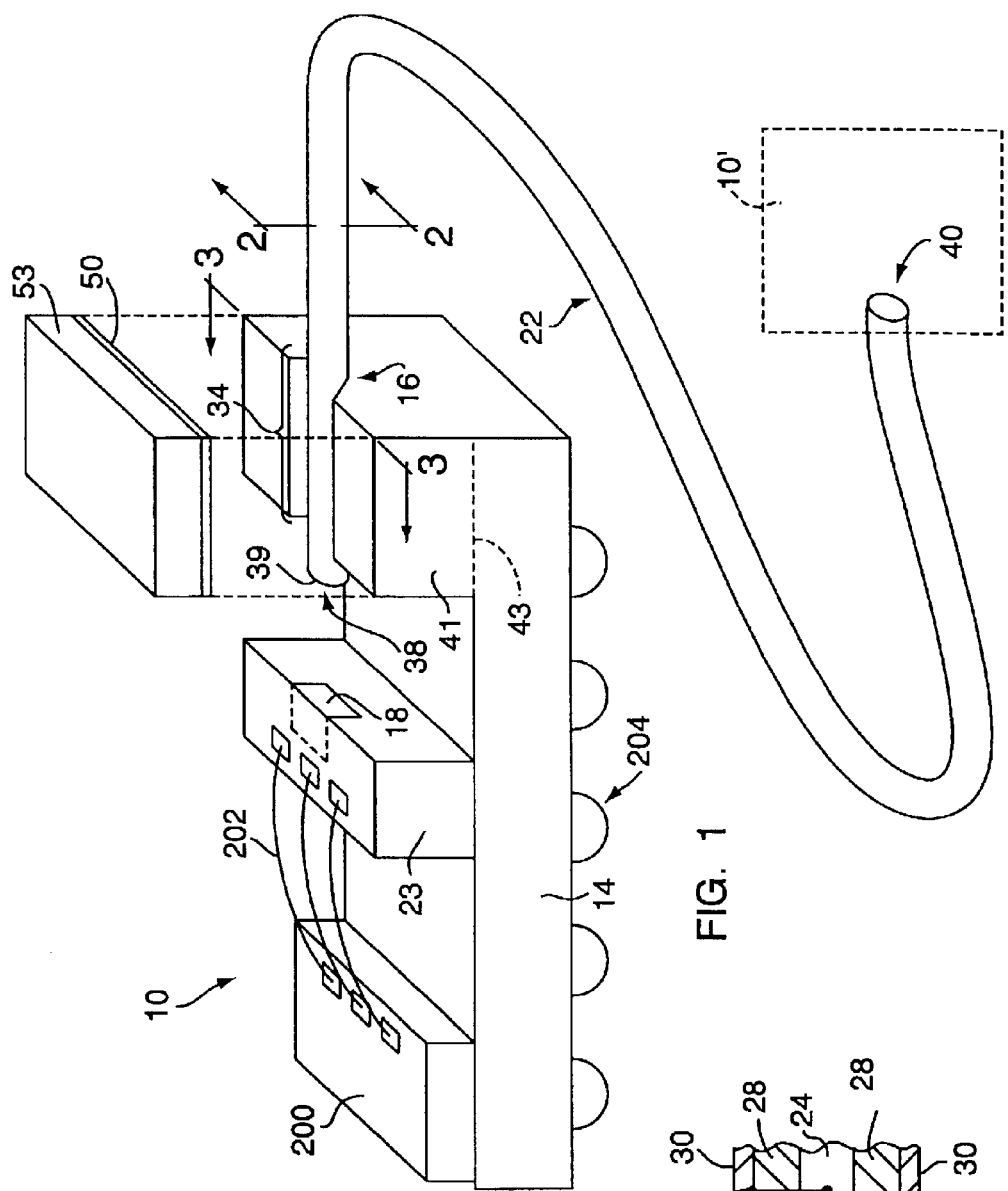

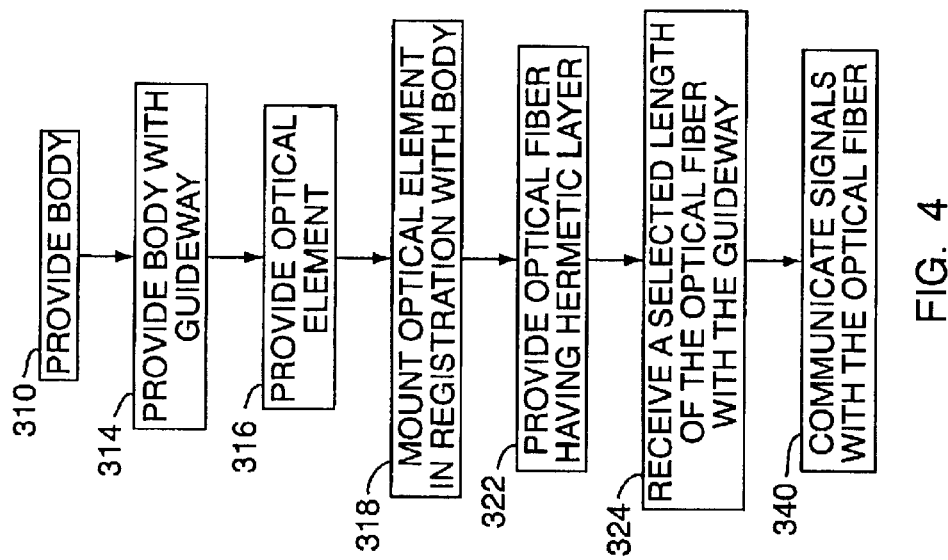
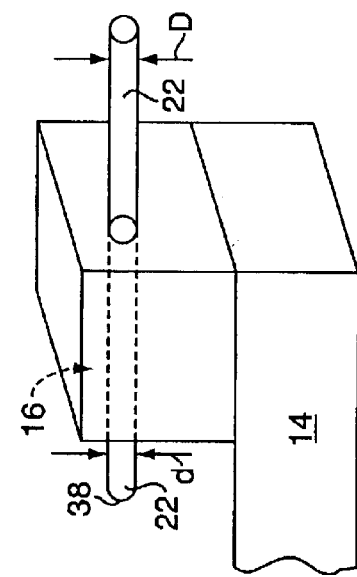
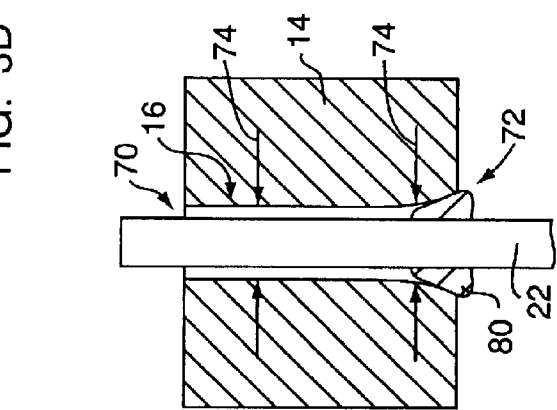
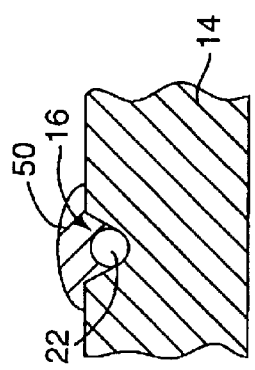
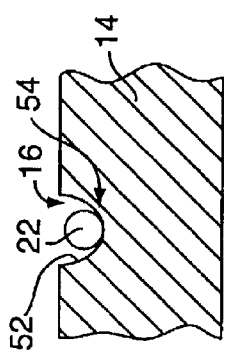

METHOD AND APPARATUS FOR COMMUNICATING SIGNALS WITH AN OPTICAL FIBER

CROSS-REFERENCE TO RELATED APPLICATIONS

This application is a continuation of International Application No. PCT/US01/49853, having an international filing date of Dec. 21, 2001, and which in turn claims priority to U.S. Provisional Patent Application Ser. No. 60/257,966 filed on Dec. 22, 2000.

FIELD OF THE INVENTION

This invention relates to optical fibers and, more particularly, to methods and apparatus for communicating optical signals between an optical fiber and a receiver or transmitter, such as a semiconductor receiver or transmitter mounted in a package.

BACKGROUND ART

Integrated circuit devices (ICs), such as microprocessors, micro controllers, and signal processors, are operating at higher and higher frequencies. For example, computer processors are currently being clocked at speeds in excess of 1 Gigahertz (GHz). At least two technological developments have contributed to this increase in operating speeds. Switching transistors, which are the building blocks of computers, now operate at lower voltages. For example, IC operating voltages have systematically dropped from 5.0 Volts to 2.2 Volts and below. Because switching power losses in transistors are proportional to the square of the operating voltage, the lower voltages reduce power dissipation, allowing higher frequency switching on the same substrate for the same total power dissipation. The second development is the use of sophisticated "radio frequency" modeling techniques for designing the layouts of conductive leads. The leads can be modeled as high frequency transmission lines, and coupling between adjacent leads as well as discontinuities, such as bends, taken into account. Such modeling has allowed the design of high-performance, multi-layered PC boards.

Unfortunately, there are disadvantages associated with such advances, such as increased sensitivity to electromagnetic interference (EMI), to voltage transients, and to common-mode noise. Desired signals can be degraded. Creative engineering and sophisticated board layouts can help reduce the deleterious effects described above. However, limits still remain. It is understood that conductive leads to high speed, low voltage ICs simply create certain problems with signal integrity and limit the speed at which signals can be propagated. For example, designers of high-speed microprocessor boards restrict communication buses emanating from the microprocessor IC to approximately 300 MHz. Multiple, parallel 300 MHz buses are used to communicate with the IC at the full bandwidth of which the IC is capable, such as 1 GHz. Each bus carries only a part of the communication with the IC. Each bus, of course, has sensitivity to EMI and other influences that reduce the integrity of the transmitted signal.

Optical fibers are known to be highly desirable for the transmission of data and other signals. Optical fibers are low cost, flexible, have a large bandwidth, and are not sensitive to EMI. However, optical fibers are not widely adopted for the communication data to and from an IC, such as the microprocessor in a personal computer.

Basically, problems associated with launching signals onto the fiber or retrieving signals off of the fiber, or, in other words, communicating with the optical fiber, limit the use of optical fibers in environments such as a personal computer, despite the advantages of fiber in terms of bandwidth, flexibility and reduced sensitivity to EMI. Many of the known techniques for communicating with an optical fiber are simply too expensive compared to other technologies, such as the use of multiple conductive 300 MHz buses.

For example, in communicating an optical signal using a fiber, optical alignment of the fiber with the transmitter or receiver with which the fiber communicates is very important, especially in higher power and/or long haul applications, to ensure that light is efficiently transferred between the receiver or transmitter and the fiber. Optical fibers have very small dimensions, and often very tight tolerances must be achieved and maintained over a range of operating parameters, such as temperature, vibration, and humidity, to provide proper optical alignment.

One approach is to terminate optical fibers in precision connectors and to mate the connectors. However, an optical connector, such as a plug connector, is typically complex and includes multiple parts, some of which can be spring loaded. The connector maintains contact between the mated fiber faces when the plug is connected with a similarly highly engineered discrete socket, or jack. Plug and jack optical connectors can also require meticulous cleaning and are subject to all manner of degradation of the face of the fiber, including degradation due to micro-cracking, and due to foreign object damage caused by triboelectric charge forces attracting and holding small particles on the end face of the fiber prior to connection. The lowest cost multimode product known today, although injection molded and known for its lowest selling price, cannot be field terminated. It must be prepared in advance to a predetermined length, and in addition, is restricted to duplex applications.

Furthermore, fibers are typically too fragile without a protective coating, or buffering, to survive in real world applications. For example, an optical fiber is coated to prevent water ingression, which can lead to catastrophic failure due to water induced microcrack propagation. Typically, the fiber is coated with a polymer or polymers. In some cases the coating is applied in eight or more individual steps to protect the fiber from such failure. The most common protective coating is an ultra violet (UV) cured acrylate. Other coatings including fluoroacrylates, polyimides, Teflon fluoropolymers, and a number of other organic compounds.

Unfortunately, problems are associated with these protective coatings. The core of the fiber is often unpredictably located with respect to the outer circumference of the coating, hindering proper optical alignment for communication of light with the fiber.

Accordingly, the protective coating is often stripped away from a short length of the optical fiber prior to assembly of the length of fiber into a connector or optical package. The fiber is often mechanically stripped, which can damage the surface of the fiber and render the fiber more likely to fail in service. The fiber can also be stripped using hot sulfuric acid. However, the acid can degrade the fiber, including any remaining coatings, due to the wicking of the acid underneath one or more of the coatings. Stripping the fiber introduces a discontinuity in the protective coating where the coating suddenly ends and the stripped portion of the fiber begins. This discontinuity can concentrate stresses on the fiber at the discontinuity, also tending to promote failure of the fiber. The amount of stress concentrated can depend on the nature of the coating that is stripped.

It is also known to metallize, typically via electroplating, electroless plating, or vapor deposition, the cladding layer that is exposed upon stripping the fiber. The metallized cladding can be soldered into a ferrule, which ferrule is in turn soldered into a passage in an active or passive component package. "Glues," such as epoxy resins, and RTV silicone compounds are used to fill in gaps and to avoid microbend induced stresses that cause unacceptable optical performance degradation. To enhance the mechanical integrity of the optical assembly, a part of the fiber in the ferrule may retain the polymer layer, such that the core of the optical fiber may be displaced relative to and/or disposed at an angle to the longitudinal axis of the ferrule. Often the length of the passage is longer than the length of the ferrule, and because of the high variability in fiber thickness due to unpredictable thickness and/or location of the protective coating, as noted above, the passage includes a large diameter. This creates the larger gap to fill with the "glue" and also increases the risk of angular misalignment of the fiber.

After all of the foregoing—stripping, plating, and soldering a ferrule onto the fiber and into a package—it is typically still necessary for a technician to optically align the fiber and the device, that is, the receiver or transmitter in the package, with which the fiber communicates. Typically, the location of the packaged device or of a free end of the fiber is adjusted while measuring the transmission of light between the fiber and the device. When the location is found that corresponds to acceptable light transmission, the location of the device or the free end is fixed. In one common practice, a second ferrule is soldered to the fiber near the free end, and this ferrule is secured to the package by placing a clamp over the ferrule and welding the clamp to the package, thereby fixing the fiber in proper optical alignment with the device. This procedure is laborious and costly.

From the foregoing, it is apparent that improvement in methods and apparatus for communicating signals with an optical fiber would represent a welcome advance in the art. Accordingly, it is an object of the present invention to address one or more of the foregoing disadvantages or drawbacks of the prior art.

Other objects will become apparent below to one of ordinary skill in the art.

SUMMARY OF THE INVENTION

According to a preferred embodiment, an optical assembly for the communication of an optical signal between an optical fiber and a receiver or transmitter includes a body including a guideway and a first semiconductor optical element for conversion between electrical and optical signals and for receiving or transmitting light. The semiconductor optical element is mounted in register with the body. The optical assembly also includes an optical fiber having a first end, a core, a cladding surrounding the core, and a protective coating deposited on the cladding. The guideway receives a selected length of the optical fiber, where the selected length includes the entire length of the fiber received by the guideway. The selected length has not been stripped of a coating deposited on the cladding. When the selected length is received by the guideway, the first end of the optical fiber is optically aligned with the optical element such that neither the location of the first end nor the location of the optical element is adjusted responsive to the measurement of the transmission of light between the optical element and the optical fiber.

In another aspect of the invention, an optical apparatus includes a body including a guideway and a first semiconductor optical element for conversion between electrical and optical signals and for receiving or transmitting light. The semiconductor optical element is mounted in register with the body. The apparatus also includes an optical fiber, where the optical fiber extends from a first end to a second end and includes a core, a cladding surrounding the core, and a protective coating surrounding the cladding. The guideway receives a selected length of the optical fiber, and the protective coating is included on the fiber for at least a majority of the selected length. The selected length includes the entire length of the fiber received by the guideway. The optical fiber, when received by the guideway, has the first end optically aligned with the optical element such that neither the location of the first end nor the location of the optical element is adjusted responsive to the measurement of the transmission of light between the optical element and the optical fiber. The optical apparatus also includes a second guideway that receives a second selected length of the optical fiber, where the second selected length includes the entire length of the fiber received by the second guideway, and a second optical element that is optically aligned with the second end of the optical fiber. The protective coating is present along all of a length of the fiber, the length including the majority of the first selected length and a majority of the second selected lengths and the entire length of the optical fiber therebetween.

In yet a further aspect of the invention, an optical assembly for communication of an optical signal between an optical fiber and a receiver or transmitter includes a body including a guideway having a wall and a first semiconductor optical element for conversion between electrical and optical signals and for receiving or transmitting light. The semiconductor optical element is mounted in register with the body. The optical assembly also includes a length of optical fiber having a first end, a core, a cladding surrounding the core, and a coating deposited on the cladding. No other coating is deposited over the coating for the length of the fiber, and the coating has a thickness of less than about 1 micron. The length of optical fiber has an n-factor of at least 50. The guideway receives a selected length of the optical fiber such that the coating contacts the wall of the guideway, and the selected length includes the entire length of the fiber received by the guideway. The fiber includes the coating thereon for at least a majority of the selected length. The first end of the optical fiber is optically aligned with the optical element.

The invention also includes methods for communicating an optical signal between an optical fiber and a receiver or transmitter. In a preferred embodiment, the method includes providing a body; providing the body with a guideway; providing a semiconductor optical element for conversion between electrical and optical signals and for one of receiving and transmitting light; mounting the optical element in register with the body; providing an optical fiber having a first end, the optical fiber including a core, a cladding surrounding the core, and a hermetic coating deposited on the cladding; placing a selected length of the optical fiber in the guideway for being received thereby and for optically aligning the first end of the fiber with the optical element, the selected length being all of that portion of the optical fiber that is received by the guideway; refraining from stripping a coating in contact with the cladding from the selected length of the fiber; and wherein neither the location of the first end of the optical fiber nor the location of the optical element is adjusted responsive to the measurement of the transmission of light between the optical element and the optical fiber.

BRIEF DESCRIPTION OF THE DRAWINGS

FIG. 1 is a perspective view of an optical assembly according to the invention;

FIG. 2 is a cross section of the optical fiber of the optical assembly of FIG. 1 taken along section line 2—2;

FIG. 3A is cross section, taken along section line 3—3, of the guideway 16 of FIG. 1;

FIG. 3B is a cross section, similar to that of FIG. 3A, wherein the guideway 16 includes a cylindrically shaped wall;

FIG. 3C is a cross section showing the guideway including a fully cylindrical passage;

FIG. 3D is a perspective view of the guideway 16 of FIG. 3C;

FIG. 3E is a top view of the guideway of FIG. 1;

FIG. 4 is a flow chart illustrating method steps for communicating an optical signal between an optical fiber and a receiver or transmitter according to one practice of the invention;

DETAILED DESCRIPTION OF THE PREFERRED EMBODIMENTS

Figure 5A:
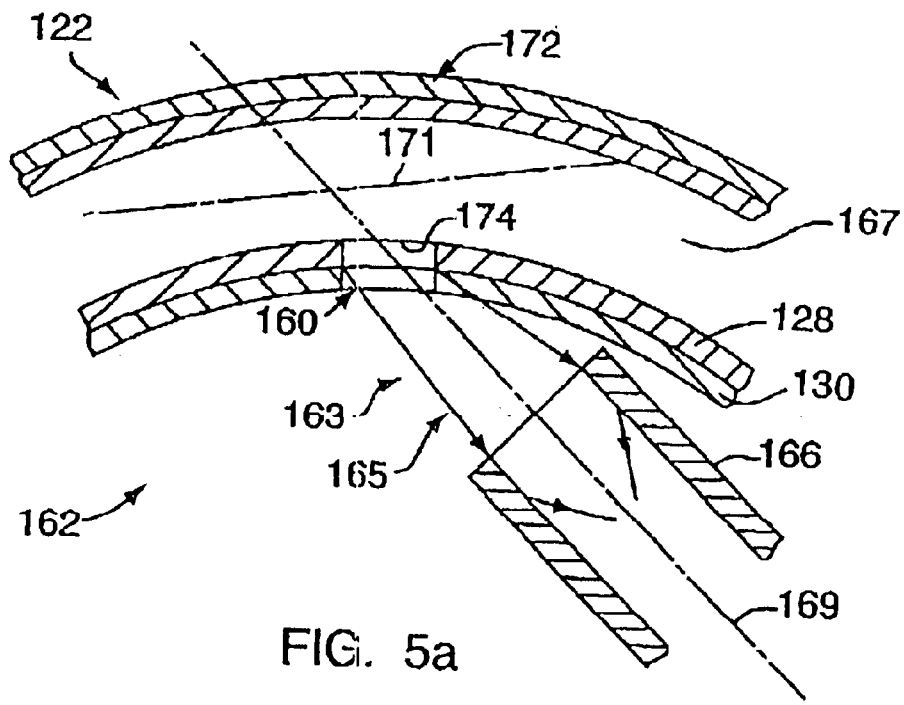
FIG. 5A is a schematic illustration of an optical tap.

FIG. 1 is a perspective view of an optical assembly 10 for communication of an optical signal between an optical fiber and an optical element, which optical element can include a receiver or transmitter. Communication between, or communication with, as used herein, refers to the transmission of signals from one entity to another, the reception of signals by one entity from another, or both the reception and transmission of signals.

The optical assembly 10 includes a body 14 having a guideway 16. The body 14 and the guideway 16 can be unitary, in that one piece of material can be machined or otherwise shaped or formed to define the body 14 having the guideway 16, or can include a plurality of pieces, which pieces can be of different types of materials, that are integrated together to provide the body 14 having the guideway 16. The body 14 can include, but is not limited to, materials such as ceramics, plastics, including glass-impregnated plastics, and metals, such as machined or injection molded metals.

The optical assembly 10 can include an optical element 18 for conversion between electrical and optical signals and receiving and/or transmitting light, and an optical fiber 22. The optical element 18 can include a semiconductor substrate 23, such gallium arsenide or indium phosphide.

With reference to FIG. 2, which is a cross section of the optical fiber 22 taken along section line 2—2, the optical fiber 22 can include a core 24, a cladding 28 surrounding the core, and a protective coating or layer 30, which is preferably highly hermetic, surrounding the cladding 28. The optical fiber 22 can be adapted for the multimode propagation of light by the core 24, or alternatively, for single mode propagation of light by the core 24.

Referring again to FIG. 1, the guideway 16 receives a selected length 34 of the optical fiber, and the coating 30 is present along a majority of the selected length 34. Preferably, the coating 30 is present along all or nearly all of the selected length 34. When the selected length 34 of the optical fiber 22 is received by the guideway 16, the optical fiber 22 is sufficiently optically aligned. Neither the location of the end 38 of the optical fiber 22 nearer to the optical element 18 nor the location of the optical element 18 is adjusted responsive to the measurement of the transmission of light between the optical element 18 and the optical fiber 22.

The guideway 16 shown in FIG. 1 includes a V-groove. Such a V-groove can be micromachined into a silicon substrate 41, which is included by the body 14. For example, the dotted line 43 can represent the boundary between the silicon substrate 41 and the remainder of body 14, to which the silicon substrate 41 is appropriately mechanically secured or coupled. Micromachining refers to the use of photolithographic techniques to shape or otherwise define materials and structures, and often takes advantage of the preferential etching of certain materials, such as silicon.

A compliant material 50 can be provided for ensuring that the selected length 34 of optical fiber 22 stays in the guideway 16. The compliant material 50 can be secured to a cover 53 included with the body 14. Alternatively, the compliant material 50 can simply be disposed in or along the guideway 16.

The optical element 18 can be mounted in register with the body 14. Register, as used herein, refers to locating the optical element 18, or other element, relative to the body 14 such that a selected feature of the optical element 18 is within a selected distance of or otherwise arranged in a desired physical relationship to a selected feature associated with the body 14. The selected feature associated with the body can include the guideway 16, or another feature having a known relationship to the guideway or that will have a known relationship to the guideway 16 when the body 14 is provided with the guideway 16. Mounting the optical element 18 in register with the body 14 can include mounting the optical element 18 to the body 14 without close attention to the location of the optical element 18, and then providing the body 14 with the guideway 16, where the guideway 16 is located so as to be in desired relationship to the optical element 18.

The optical fiber 22, including the protective coating 30, preferably has an n-factor of 50 or higher; more preferably, the optical fiber 22 has an n-factor of 100 or higher, and most preferably, the optical fiber has an n-factor of 200 or higher. One protective, hermetic coating considered to be useful for the purposes of the present invention includes silicon carbide and is disclosed in U.S. Pat. No. 4,512,629, issued on Apr. 23, 1985 to Hanson et al. and assigned at the time of issuance to Hewlett-Packard Co., and herein incorporated by reference. Typical prior art fibers having a polymer coating have n values substantially less than 50, such as n values of 10–20.

Coatings in accordance with the invention are preferably 1) highly hermetic, 2) less than about a micron thick, and 3) do not include a polymer, though all of the foregoing need not all be included in the same fiber. The protective coating 30 can be primarily carbon, with, for example, silicon carbide formed at the interface between the coating 30 and the cladding 28.

Reception by the guideway 16 of the selected length 34, preferably with the outer circumference 42 immediately adjacent to a wall of the guideway 16, suitably locates core 24 of the optical fiber for the transmission or reception of optical signals. Preferably, the location of the core 24 relative to the outer circumference 42 of the coating does not vary by more than about 3 microns along the length of the fiber; more preferably the location of the core 24 relative to the outer circumference 42 of the coating 30 does not vary by more than about 2 microns along the length of the optical fiber 22, and most preferably, the location of the core 24 relative to the outer circumference 42 does not vary by more about 1 micron along the length of the fiber 22. For example, with reference to FIG. 2, the first radius $R_1$ and the second radius $R_2$ can be subtracted to determine the variation in the location of the core along the length of the optical fiber 22. If the coating is not uniformly deposited about the fiber, such that the core is offset, the radii $R_1$ and $R_2$ can correspond to the maximum radius at the point along the fiber at which the radius is measured.

It is considered that suitable hermetic coatings can be formed by carbides, nitrides and borides of elements such as, for example, aluminum, titanium and silicon, and can be formed by other similar materials as well. The thickness t of the protective coating 30 can be important in enhancing the properties of hermeticity and mechanical strength of the optical fiber 22. For example, for certain protective coatings of silicon carbide, one monolayer is not suitably hermetic and more than two monolayers is not considered to provide adequate mechanical strength, as it is prone to cracking. Thus, two monolayers of silicon carbide is the desired thickness. Accordingly, in one practice of the invention, the hermetic coating 30 has a thickness of a selected number of monolayers of a selected composition or compositions of material, and that the number of monolayers is selected so as to be high enough to provide hermeticity and low enough so as to avoid undue degradation of the mechanical strength of the optical fiber 22, such as by the optical fiber 22 being more prone to cracking. Typically, a suitable thickness in monolayers is less than 100 monolayers of a selected composition or compositions, and in one practice is from two to 20 monolayers. The suitable thickness can also be from two to ten monolayers of a selected composition or compositions.

Preferably, the protective coating 30 is deposited directly on the outermost cladding layer of the optical fiber 22 and the optical fiber 22 includes no other coatings deposited over the protective coating 30 such that the outer circumference 42 of the coating 30 is in contact with a wall of the guideway 16. The optical fiber 22 can be intubated, such as with a loose tube material such as hytrel. Preferably, the optical fiber 22 does not include a polymer layer deposited on a cladding layer thereof. It is possible that the coating 30 can be metallized, and the metallization soldered or epoxied to the guideway.

Hermetic coatings of the type preferred herein can often tolerate wide temperature excursions, such as to several hundreds of degrees Celsius above and below the temperature that conventional polymer coatings can withstand. Conventional polymer coated fibers, including the high temperature polyimide coatings, can suffer irreversible degradation at temperatures as low as 100 degrees Celsius, and the maximum temperature that typically can be tolerated is about 300 degrees Celsius. Polymer coated fiber can also become brittle at only a few tens of degrees below zero Celsius. Accordingly, in one practice, the invention can be used in applications that involve high temperature electronics, aerospace environments, earth science environments, and combustion engines.

Furthermore, the optical fiber 22 can be cleaved in the field and the optical assembly 10 put together from spooled fiber. A premade length of optical fiber terminated with appropriate plugs, such as injection-molded plugs, need not be ordered in advance. In one practice of the invention, a piece of fiber extending from the end 40 to the end 38 in FIG. 1 is simply cleaved to the proper length. The end 40 typically terminates at another device, which can include an optical assembly similar to optical assembly 10, as indicated schematically by reference numeral 10'.

In one practice of the invention, the integrated circuit 200 can include the optical element 18. However, the typical integrated circuit 200 includes a silicon semiconductor substrate and many materials suitable for the fabrication of the optical element 18 include gallium arsenide or indium phosphide or similar compounds that can be difficult to include with a silicon substrate so as to provide a high performance optical element 18. Accordingly, the yield may be lower in producing such an embodiment of the invention.

The optical fiber 22 can typically be cleaved with precision and without risking damage to the protective coating 30. Thus, the added cost of recoating a stripped portion of the optical fiber with polymer sealants, as is often done in fibers that include polymer coatings, can in many instances be avoided. Cleaving can provide a fiber end, such as the fiber end 38, that can be easily produced in the field and that passes light with minimal attenuation. The surface 39 of the fiber end can be enhanced by vapor deposition of anti-reflective coatings, typically at very high yields because organic coatings that can out gas in a vacuum chamber of such a coating apparatus are not present. The optical element 18 can include a low cost transmitter, such as an LED or a simple Fabry-Perot or other laser, and thus can provide adequate power output, as well as high enough bandwidth, for communication with many useful integrated circuits.

Furthermore, the optical fiber 22 can be cleaved in the field and the optical assembly 10 put together from spooled fiber. A premade length of optical fiber terminated with appropriate plugs, such as injection-molded plugs, need not be ordered in advance. In one practice of the invention, a piece of fiber extending from the end 41 to the end 38 in FIG. 1 is simply cleaved to the proper length. The end 40 typically terminates at another device, which can include an optical assembly similar to optical assembly 10, as indicated schematically by reference numeral 10'.

Although the body 14 is shown in FIG. 1 as including a number of features, the body 14 can be a simple piece of metal that is appropriately machined or formed.

FIG. 3A is cross section, taken along section line 3—3, of the guideway 16 of FIG. 1. Compliant material 50 helps ensure that the optical fiber 22 remains in the guideway 16. FIG. 3B is a cross section, similar to that of FIG. 3A, wherein the guideway 16 includes a cylindrically shaped wall, such as the wall 52 of a half round passage 54, and FIG. 3C is a cross section wherein the guideway includes a cylindrical passage defined by the wall 57.

FIG. 3D is a perspective view of the guideway 16 of FIG. 3C. With reference to FIG. 3D, in one practice of the invention, the guideway 16 includes a passage having a diameter d selected so as to be very close to outer diameter D of the optical fiber 22. For example, the diameter d of at least a portion of the guideway 16 can be selected so as to restrict the passage of water molecules through the interstitial space between the outer circumference 42 (see FIG. 2) of the optical fiber 22 and the wall of the guideway 16. The guideway can include a taper that reduces to the diameter d. Adhesive or bonding material can be applied for strain relief and/or to retain the optical fiber 22 in the guideway 16.

Passages having accurately determined diameters can be produced via the above-mentioned micromachining techniques. Providing a cylindrical guideway 16 that provides a tight fit to the optical fiber 22, such as where the diameter d of the guideway 16 is only angstroms larger than the outside diameter D of the optical fiber 22, can provide more accurate optical alignment of the optical fiber 22 with the optical element 18. The end of the optical fiber 22 can be tapered, if necessary, to facilitate reception of the selected length 34 of the optical fiber 22 by the guideway 16. The tapered end can be removed by cleaving the optical fiber 22 after the selected length 34 is received by the guideway 16.

FIG. 3E is a top view of the guideway of FIG. 1. The guideway 16 extends from one end 70 to another end 72, and can be expanded at one end, typically such that the diameter 74 of the V-groove increases along the length of the guideway, such as according to a parabolic function, to provide strain relief. A suitable material 80 can be included between the optical fiber 22 and the guideway 16 to adhere the optical fiber 22 to the body 14 and/or provide strain relief for the optical fiber 22.

The present invention may be particularly useful in providing communication of signals between a first device, such as a processor for a personal computer, and another device that is located relatively physically close to the first device, such as within 100 meters of the first device. At each device, an optical assembly, such as the optical assembly 10, can be provided for communicating between the optical fiber and the device. In many applications, the required communication distances are less than 10 meters or even less than 1 meter. Many on board devices in a computer are not located more than a few centimeters from the processor, and others, such as remote peripheral devices, such as memory, hard drives, sundry I/O devices such as monitors and the like, are well within 100 meters. In such short-haul applications, which can include communications in a Local Area Network (LAN), dispersion along the optical fiber 22 is less of a concern than in long haul communications.

Development efforts, however, for optical receivers and transmitters have been focused largely on long-haul communications, using wavelength division multiplexing, where dispersion is of importance and single mode, narrow-band and coherent light sources are required. Such receivers and transmitters can be expensive, and are typically operated using long wavelength, non-visible infrared light with highly focused light beams that provide a small, intense spot of light. Specialized test equipment can be required for even the simplest of troubleshooting endeavors. Furthermore, the combination of infrared wavelengths and the transmission energy levels require thorough and careful eye protection for testers, troubleshooters and users desiring to reconfigure any fiber-to-fiber or fiber-to-device connection.

In many applications, such as those noted above, where dispersion is less of a concern, the optical element 18 need not be an expensive single mode, coherent light source and the optical fiber 22 need not be a single mode optical fiber. Accordingly, in such a practice of the invention, the optical fiber 22 can be a high numerical aperture fiber and the optical element 18 includes an LED. Preferably, the optical element 18 includes a transmitter or receiver that operates in the 740 to 880 nm visible red and near infrared region. Such transmitters and receivers use a visible light output that is adequate for simple trouble shooting techniques. These techniques include, but are not limited to, simple visual inspection to determine if a light beam is present.

Thus, the combination of the optical fiber 22 having a multimode core 24 and an optical element 18 that includes either a light emitting diode or a photodetector is considered to provide a low cost and robust bus that can be used, for example, in a personal computer to communicate signals between the processor and other devices, such as memory. Such a bus can be readily operated at 622 MHz, which is twice the speed of the 300 MHz conductive buses now used, without the problems of EMI and sensitivity to voltage transients. Of course, the optical element 18 need not be limited to a low cost, incoherent multimode device. The optical element 18 can also include a semiconductor laser, such as a Fabry-Perot laser diode having cleaved faces, or a more sophisticated laser, including, but not limited to, a monolithic Bragg laser, such as a Distributed Feedback (DFB) laser or a Distributed Back Reflection Laser, as well as a vertical-cavity surface emitting laser (VCSEL), or a quantum well laser (QWL).

In one practice of the invention, the optical assembly 10 of FIG. 1 may be used in combination with one or more optical fiber taps to allow optical communication with the optical fiber 22 at a location along the fiber 22 between the ends 38 and 40 of the optical fiber 22. Likewise a plurality of optical assemblies 10 may be interconnected using optical taps, as will be more fully described below.

Referring to FIG. 5A, the optical tap 162 allows communication between the optical fiber 122 and another optical element, shown as in FIG. 5A as the branch optical fiber 166, at the coupling juncture 163. The branch optical fiber 166 has an optical axis 169, as shown in FIG. 5A. The optical tap 162 allows signal energy to be extracted from, or launched onto, a signal-containing fiber 122, having an optical axis 171. The signal-containing optical fiber 122 is bent a relatively small angular amount, typically in the range of ten to forty degrees (10°–40°), to form a bend zone 172 that facilitates the escape of light from the core 167.

A portion of the cladding 128 and protective coating 130 can be removed to form a port 160 to expose the core portion 174 at the bend zone 172. When the signal-containing optical fiber 122 is bent and the port 160 is formed, a fraction of the signal energy 165 escapes through the port 160 and can be collected by the branch optical fiber 166 brought into close proximity of the bend of the signal containing fiber 122.

The optical tap 162 is typically bidirectional, such that signals may be launched onto the signal-containing fiber 122 or extracted from the signal-containing fiber 122 through the port 160. In the case of a launch tap, the optical element transmits signal energy onto the signal-containing fiber 122 through the port 160. Although only one tap 162 is shown in FIG. 5A, it is possible to use more than one tap. The size and geometry of the port 160 and the parameters of the optical element in communication with the signal-containing fiber 122 are chosen to maximize the number and efficiency of the tap or taps in a given configuration.

As is understood by one of ordinary skill in the art, optical fibers propagate light in the core due to the phenomenon of total internal reflection from the cladding of the fiber. The cladding, having a lower index of refraction than the core, reflects light incident thereon back into the core, confining the light to the core. However, as is also understood by one of ordinary skill in the art, this phenomenon works best for light that is incident on the cladding at an angle that is less than the confinement angle, which can be rather low (e.g., 8 degrees). Bending the signal containing fiber can cause light in the core 167 be incident on the cladding at an angle that exceeds the confinement angle, and thus to exit the core 167. Light incident on the cladding from outside the fiber 122 can also enter the core. Accordingly, it may not be necessary to include the port 160 in the cladding 128 and protective layer 130, especially when the protective layer is thinner than the typical polymer layer known in the art (the typical polymer layer known in the art has a thickness of 62.5 microns). However, the use of the port 160 may allow light to more readily enter and exit the fiber 122 than simply bending the fiber 122. In one practice of an optical tap, disclosed in U.S. Pat. No. 5,517,590 incorporated by reference below, no port is formed in the cladding. As taught in the '590 patent and the other references noted below, a short length of the protective coating can be stripped from the fiber. This is not preferred in the practice of the present invention.

Figure 5B:
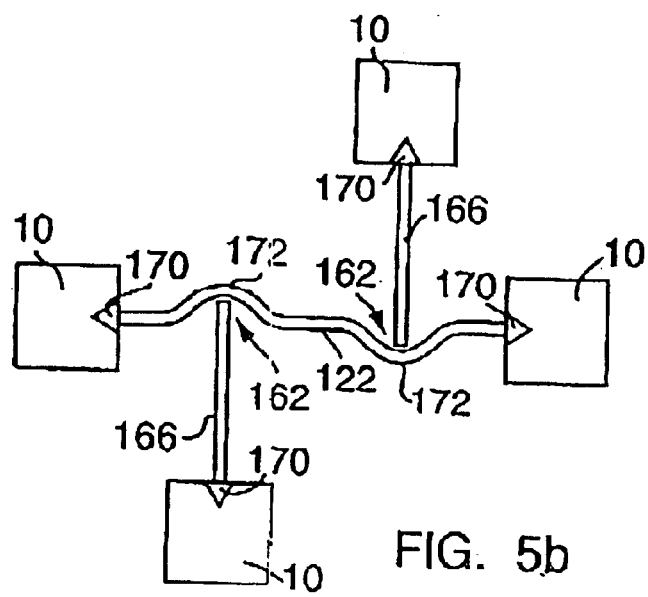
FIG. 5B depicts a plurality of optical assemblies of FIG. 1 interconnected by a combination of optical taps.

Referring to FIG. 5B, the optical elements (depicted herein as branch optical fibers 166) are positioned near the bend zones 172 in the signal-containing fiber 122 to allow communication between the optical fiber 166 and signal-containing fiber 122. However, as is understood by those skilled in the art, other optical transmitters and receivers may be used to communicate with the signal-containing fiber 122. The combination of the optical assembly of FIG. 1 with the optical fiber tap 162 depicted in FIG. 5A is an embodiment of the present invention that is advantageous, not only for communication between a plurality of optical assemblies, but also for local area networks, metropolitan networks, building networks, and optical assemblies connecting computers, servers, and routers, for example.

For additional information, see the publications "A Hard Clad Silica Fiber Multi Tap Bus System," authored by Malcom H. Hodge and James A. Moras of the Ensign Bickford Company of Simsbury, Conn., and presented at the FOCLAN conference held in 1986 in Orlando Fla., and "Tapping Optical Fiber," by William B. Beck, published in *Laser Focus World* November 1987. Both of the foregoing are hereby incorporated by reference herein to the extent necessary to understand the present invention. See also, U.S. Pat. No. 5,517,590, issued May 14, 1996 to Auborn et al., which is also incorporated by reference herein to the extent necessary to understand the present invention.

FIG. 4 is a block diagram illustrating steps that can be followed for providing communication between the optical fiber 22 and the semiconductor optical element. The method includes, as indicated by blocks 310 and 314 respectively, providing a body, and providing the body with a guideway. As shown in blocks 316 and 318, the method also includes providing a semiconductor optical element for conversion between electrical and optical signals and for receiving or transmitting light; and mounting the semiconductor optical element in register with the body. Proceeding to block 322, the method can involve providing an optical fiber 22 (see FIG. 2), where the optical fiber includes a core 24, a cladding 28 surrounding the core 24, and a protective layer 30 surrounding the cladding 28. The optical fiber 22 can have an n-factor of 50 or greater, or alternatively or additionally, the protective layer 30 can be a non-polymer hermetic coating having a thickness of 1 micron or less. As indicated by block 324, the method can also include receiving a selected length 34 of the optical fiber 22 with the guideway 16, where the hermetic coating 30 is present along a majority of the selected length 34, and more preferably, is present along all or nearly all of the selected length 34. The selected length 34 of the optical fiber 22, when received by the guideway 16, provides optical alignment for the transmission of light between the optical fiber 22 and the optical element 18 without having to adjust the location of the end 38 of the optical fiber 22 or the location of the optical element 18 responsive to the measurement of the transmission of light between the optical element 18 and the optical fiber 22. As indicated by block 340, signals can now be communicated between the optical fiber 22 and the optical element 18.

Figure 6:
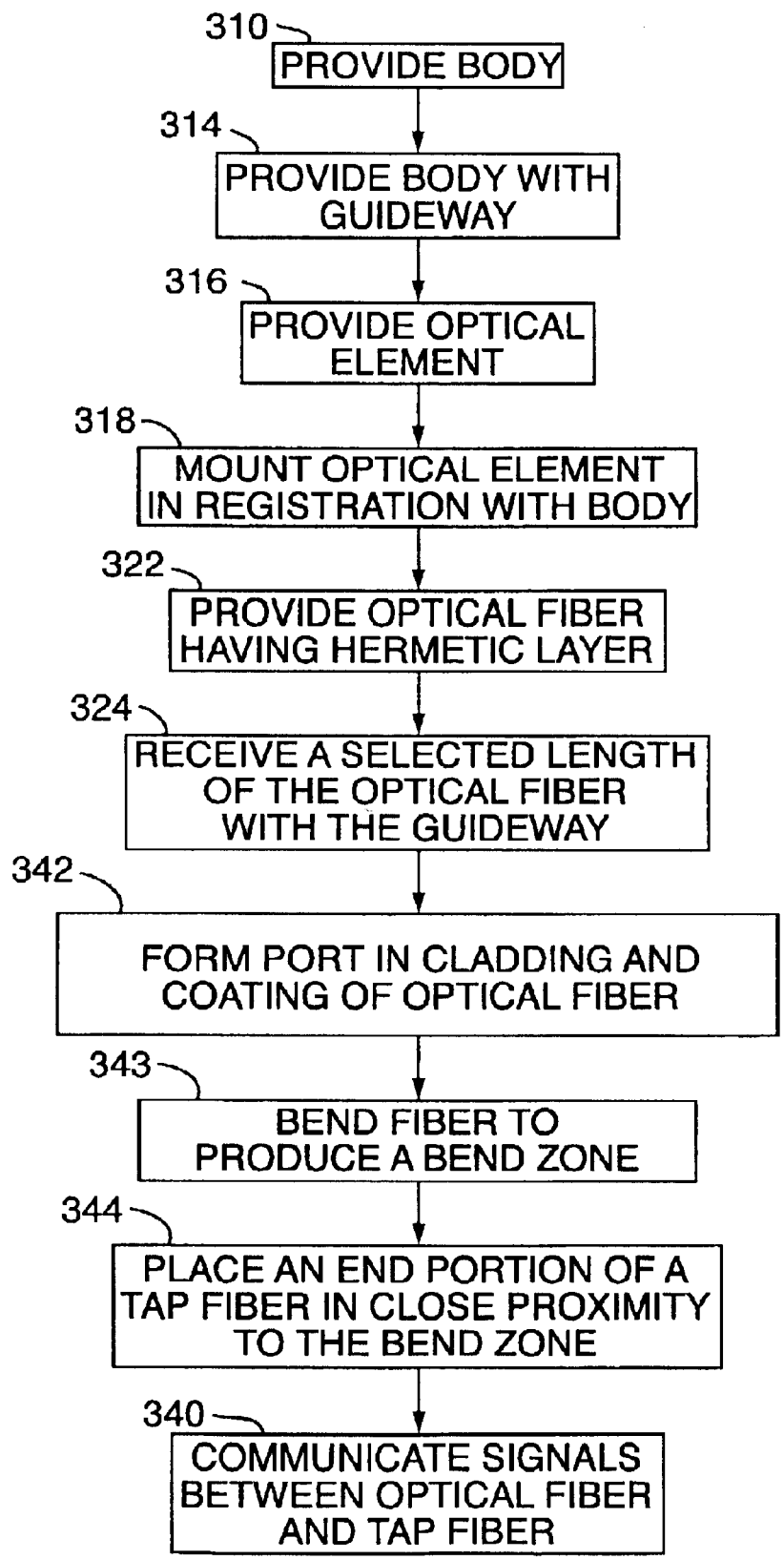
FIG. 6 is a flow chart illustrating method steps for communicating an optical signal between an optical fiber and an optical element such as a receiver or transmitter, where the method includes the use of an optical tap.

FIG. 6 shows steps that can be followed to communicate with an optical fiber in a practice of the invention using an optical tap. As indicated by blocks 342–344, when the optical tap includes a branch optical fiber, the further steps include forming a port through the cladding and protective layer of the signal-containing fiber, as indicated by 342, bending the signal-containing fiber so as to produce a bend zone, as indicated by 343, and placing a second optical element, typically a branch optical fiber having an end portion, in close proximity of said bend zone, as indicated by 344. The respective optical axes 169, 171 of the signal-containing optical fiber and the branch optical fiber are disposed in a common plane to allow communication therebetween. As noted above, the second optical element may include an optical receiving or transmitting element other than a branch optical fiber, such as a photodetector, LED or laser diode.

The foregoing descriptions of FIGS. 4 and 6 are not meant to imply that the steps must be followed in the particular order described above. One of ordinary skill in the art, informed of the disclosure herein, will appreciate that the order can be changed in other practices of the invention.

It will thus be seen that the invention efficiently obtains the objects set forth above, as well as those made apparent from the disclosure herein. It is intended that all matter included in the present disclosure be interpreted as illustrative and not in a limiting sense, as one of ordinary skill in the art, apprised of the disclosure herein, can make certain changes in the above constructions without departing from the spirit or scope of the invention. For example, FIG. 1 shows a single optical fiber and a single guideway. One of ordinary skill in the art, aware of the disclosure herein, appreciates that the invention can be practiced with a block having a plurality of guideways that receive a plurality of optical fibers, such as for providing a parallel bus. Also, many of the known polymer-type coatings discussed above, as currently applied to a fiber, do not sufficiently predictably locate the core of the optical fiber relative to the coating. However, one of ordinary skill in the art, apprised of the disclosure herein, may envision techniques or apparatus for improving the location of such coatings relative to the core of the fiber so as to practice the invention, and such practices are deemed within the scope of the invention.

Accordingly, it is understood that the following claims are intended to cover generic and specific features of the invention described herein, and all statements of the scope of the invention, which as a matter of language might be said to fall therebetween.

I claim:

1. An optical assembly for communication of an optical signal between an optical fiber and a receiver or transmitter, comprising a body including a guideway;

a first semiconductor optical element for conversion between electrical and optical signals and for one of receiving and transmitting light, said semiconductor optical element mounted in register with said body;

an optical fiber having a first end, said optical fiber including a core, a cladding surrounding the core, and a protective coating deposited on said cladding;

said guideway receiving a selected length of said optical fiber, said selected length including the entire length of said fiber received by said guideway, said selected length not having been stripped of a coating deposited on said cladding; and wherein when said selected length is received by said guideway said first end of said optical fiber is optically aligned with said optical element such that neither the location of said first end nor the location of said optical element is adjusted responsive to the measurement of the transmission of light between said optical element and said optical fiber.

2. The optical assembly of claim 1 wherein said guideway includes a V-groove.

3. The optical assembly of claim 1 wherein said guideway is defined at least in part by a wall formed by micromachining a semiconductor substrate.

4. The optical assembly of claim 1 wherein said optical element includes one of a light emitting diode and a photodetector, said core of said optical fiber being adapted for multimode propagation, and wherein said optical fiber extends from said first end to a second end that is optically aligned with a second semiconductor optical element, said length of said fiber from said first end to said second being no greater than 100 meters.

5. The optical assembly of claim 1 wherein said core of said optical fiber is adapted for the single mode propagation of light by said core.

6. The optical assembly of claim 1 wherein said protective coating is hermetic and includes silicon carbide.

7. The optical assembly of claim 1 wherein said protective coating is hermetic and has a thickness of from two to 20 monolayers of a selected molecular composition.

8. The optical assembly of claim 1 wherein protective coating is hermetic and includes one of a carbide, nitride and boride of one of silicon, aluminum and titanium.

9. The optical assembly of claim 1 wherein said body is adapted for receiving an integrated circuit and includes conductive paths for communication of signals between said optical element and said integrated circuit when received by said optical assembly.

10. The optical assembly of claim 1 wherein said body further includes a ball grid array for electromagnetic communication with said integrated circuit device.

11. The optical assembly of claim 1 wherein said protective coating is not thicker than 1 micron.

12. The optical assembly of claim 1 further comprising an optical tap including a second optical element in communication with said optical fiber.

13. An optical apparatus for communication of optical signals, comprising:

a body including a guideway;

a first semiconductor optical element for conversion between electrical and optical signals and for one of receiving and transmitting light, said semiconductor optical element mounted in register with said body;

an optical fiber, said optical fiber extending from a first end to a second end and including a core, a cladding surrounding the core, and a protective coating surrounding said cladding;

said guideway receiving a selected length of said optical fiber, said protective coating being included on said fiber for at least a majority of said selected length and said selected length including the entire length of said fiber received by said guideway;

said optical fiber, when received by said guideway, having said first end optically aligned with said optical element such that neither the location of said first end nor the location of said optical element is adjusted responsive to the measurement of the transmission of light between said optical element and said optical fiber;

a second guideway receiving a second selected length of said optical fiber, said second selected length including the entire length of said fiber received by said second guideway;

a second optical element optically aligned with said second end of said optical fiber; and wherein said protective coating is present along all of a length of said fiber, said length including said majority of said first selected length and a majority of said second selected lengths and the entire length of said optical fiber therebetween.

14. The optical assembly of claim 13 wherein said protective coating is a hermetic coating.

15. The optical assembly of claim 13 wherein said protective coating is hermetic and includes one of a carbide, nitride and boride of one of silicon, aluminum and titanium.

16. The optical assembly of claim 13 wherein said protective coating is hermetic and is not thicker than 1 micron.

17. The optical assembly of claim 13 including an optical tap, said optical tap including a second optical element in communication with said optical fiber.

18. An optical assembly for communication of an optical signal between an optical fiber and a receiver or transmitter, comprising:

a body including a guideway having a wall;

a first semiconductor optical element for conversion between electrical and optical signals and for one of receiving and transmitting light, said semiconductor optical element mounted in register with said body;

a length of optical fiber having a first end, said optical fiber including a core, a cladding surrounding the core, and a coating deposited on the cladding and no other coating deposited over said coating for said length of said fiber, said coating having a thickness of less than about 1 micron, and said length of optical fiber having an n-factor of at least 50;

said guideway receiving a selected length of said optical fiber such that said coating contacts said wall of said guideway, said selected length including entire length of said fiber received by said guideway, said fiber including said coating thereon for at least a majority of said selected length; and wherein said first end of said optical fiber is optically aligned with said optical element.

19. A method for communicating between an optical fiber and a transmitter or receiver, comprising:

providing a body;

providing the body with a guideway;

providing a semiconductor optical element for conversion between electrical and optical signals and for one of receiving and transmitting light;

mounting the optical element in register with the body;

providing an optical fiber having a first end, the optical fiber including a core, a cladding surrounding the core, and a hermetic coating deposited on the cladding, placing a selected length of the optical fiber in the guideway for being received thereby and for optically aligning the first end of the fiber with the optical element, the selected length being all of that portion of the optical fiber that is received by the guideway;

refraining from stripping a coating in contact with the cladding from the selected length of the fiber; and wherein neither the location of the first end of the optical fiber nor the location of the optical element is adjusted responsive to the measurement of the transmission of light between the optical element and the optical fiber.

20. The method of claim 19 wherein providing the body with the guideway includes providing a V-groove.

21. The method of claim 19 wherein providing the optical fiber includes providing the optical fiber wherein the hermetic coating is no thicker than 1 micron.

22. An optical apparatus, comprising:
- a body including a guideway;
- a semiconductor optical element mounted in register with said guideway, said semiconductor optical element for receiving or transmitting optical signals;
- an optical fiber having a first end, said optical fiber including a core, a cladding surrounding the core and a protective coating;
- said guideway receiving a selected length of said fiber such that said guideway contacts said coating for locating said core such that said first end is in optical alignment with said optical element; and wherein neither the location of said first end nor the location of said optical element is adjusted responsive to the measurement of the transmission of light between said optical element and said optical fiber.

23. The optical apparatus of claim 22 wherein said coating includes one of a carbide, nitride and boride of one of silicon, aluminum and titanium.

24. The optical apparatus of claim 22 wherein said fiber has an n-factor of at least 50.

25. The optical apparatus of claim 22 wherein said selected length of fiber is not stripped of a coating.

26. The optical apparatus of claim 22 wherein said coating has a thickness of one microns or less.

* * * * *

UNITED STATES PATENT AND TRADEMARK OFFICE
CERTIFICATE OF CORRECTION

PATENT NO. : 6,793,411 B2
DATED : September 21, 2004
INVENTOR(S) : Seifert

It is certified that error appears in the above-identified patent and that said Letters Patent is hereby corrected as shown below:

Column 1,
Line 66, replace "communication data" with -- communication of data --.

Column 7, line 65-Column 8, line 7,
delete the paragraph beginning with "Furthermore" and ending with "numeral 10'"; and Column 7,
Line 65, insert the following paragraph:
-- As shown in FIGURE 1, the body 14 can be adapted for receiving a first semiconductor substrate including an IC 200 that includes selected electronic processing circuitry. The selected electronic circuitry can include a computer processor. Conductive paths 202, such as gold bonding wire, can be included for the communication of signals between the optical element 18 and the selected electronic circuitry of the IC 200. The body 14 can include an arrangement of conductive elements 204 that can be used for, as shown in FIGURE 1, electromagnetic communication with other circuitry via a printed circuit board or the like. The arrangement of conductive elements can be a ball grid array, as shown in FIGURE 1, a surface mount termination, pinouts, wafer bumping assembly, or other arrangement of conductive elements. The arrangement of conductive elements 204 need not be disposed at the bottom of the body 14, as shown in FIGURE 1, and can be located elsewhere, such as for communication with an IC, such as IC 200. The body 14 can include a plurality of arrangements of conductive elements. For example, the IC 200 is typically mounted in register with the body 14, such as by being wafer bumped to a first arrangement of conductive elements (not shown) that is in electromagnetic communication with the arrangement of conductive elements 204 shown in FIGURE 1. --.

Column 8,
Line 38, replace "41" with -- 40 --.

UNITED STATES PATENT AND TRADEMARK OFFICE
CERTIFICATE OF CORRECTION

PATENT NO. : 6,793,411 B2
DATED : September 21, 2004
INVENTOR(S) : Seifert

It is certified that error appears in the above-identified patent and that said Letters Patent is hereby corrected as shown below:

Column 10,
Line 63, replace "in the core 167 be" with -- in the core 167 to be --.

Signed and Sealed this

Twentieth Day of September, 2005

JON W. DUDAS
*Director of the United States Patent and Trademark Office*